United States Patent
Akatsuka et al.

(10) Patent No.: US 12,438,526 B2
(45) Date of Patent: Oct. 7, 2025

(54) ANALYSIS DEVICE

(71) Applicant: NTT DOCOMO, INC., Chiyoda-ku (JP)

(72) Inventors: Hiroto Akatsuka, Chiyoda-ku (JP); Masayuki Terada, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 396 days.

(21) Appl. No.: 17/996,367

(22) PCT Filed: Mar. 24, 2021

(86) PCT No.: PCT/JP2021/012303
§ 371 (c)(1),
(2) Date: Oct. 17, 2022

(87) PCT Pub. No.: WO2021/229921
PCT Pub. Date: Nov. 18, 2021

(65) Prior Publication Data
US 2024/0048127 A1  Feb. 8, 2024

(30) Foreign Application Priority Data
May 14, 2020 (JP) .................................. 2020-085283

(51) Int. Cl.
H03H 17/02 (2006.01)

(52) U.S. Cl.
CPC ............................... H03H 17/0257 (2013.01)

(58) Field of Classification Search
CPC ........................... H03H 17/0257; G06F 17/18
See application file for complete search history.

(56) References Cited

U.S. PATENT DOCUMENTS

2017/0098021 A1* 4/2017 He ........................ B60L 58/10
2021/0001868 A1* 1/2021 Ahn ....................... G06F 17/11

OTHER PUBLICATIONS

International Preliminary Report on Patentability and Written Opinion issued Nov. 24, 2022 in PCT/JP2021/012303 (submitting English translation only), 8 pages.
International Search Report issued Jun. 22, 2021 in PCT/JP2021/012303 filed on Mar. 24, 2021, 1 page.

(Continued)

Primary Examiner — Zhipeng Wang
(74) Attorney, Agent, or Firm — Oblon, McClelland, Maier &Neustadt, L.L.P.

(57) ABSTRACT

An analysis device includes: an estimation unit that obtains a current state variable by state estimation based on a state variable for first sequence data generated by applying a first conversion to observation data, a state space model, and each element included in the first sequence data; an observation unit that generates second sequence data by applying an observation process to the current state variable; an elaboration unit that generates third sequence data by performing an elaboration process of correcting each element included in the second sequence data so that a value of each cell of the estimated observation data does not become a negative value and the number of cells having a value other than 0 included in the estimated observation data is suppressed; and a second conversion unit that generates the estimated observation data by applying a second conversion to the third sequence data.

8 Claims, 3 Drawing Sheets

(56) References Cited

OTHER PUBLICATIONS

Evensen, "Sequential data assimilation with a nonlinear quasi-geostrophic model using Monte Carlo methods to forecast error statistics", Journal of Geophysical Research: Oceans, May 15, 1994, vol. 99, pp. 10143-10162.

* cited by examiner

ANALYSIS DEVICE

TECHNICAL FIELD

The present disclosure relates to an analysis device.

BACKGROUND ART

With the development of technologies including information and communications technology, it has become possible to obtain big data, which is observation data obtained by observing events in the real world on a large scale and over a wide area, and the utilization of big data is expected. In utilizing big data, it is necessary to reduce noise contained in observation data and to perform a data assimilation process for estimating the state of an event in the real world, which is an observation target, from the obtained observation data. Modeling real-world events using state space models and state estimation using a Kalman filter is one of the most common techniques used in data assimilation.

However, when the Kalman filter is applied to data having a very large dimension number such as big data, that is, data having a very large number of cells, it is difficult to perform an actual calculation in terms of calculation cost. As big data, for example, there is mobile space statistics that estimate the population by attributes in Japan by time zone from mobile phone operation data. If the population distribution at a certain time in Japan is observed by gender, 5 year age group, and residential municipality in the ½ area mesh unit, which is the basic unit of the national census, the number of ½ area meshes throughout Japan is about 1,500,000, the number of age groups is about and the number of municipalities is about 2000. Therefore, the logical number of cells is approximately 120,000,000,000. It is difficult to apply the Kalman filter to such high-dimensional big data by preparing state variables corresponding to all cells.

As a technique for applying a Kalman filter to high-dimensional data, a technique called an ensemble Kalman filter has been proposed in Non Patent Literature 1. The ensemble Kalman filter uses a technique of estimating a state using an ensemble forecast based on sampling. In other words, it is based on the idea that a set of all state variables of each cell of high-dimensional data is treated as a whole state variable, and the whole is estimated using the estimation based on a part of the sample. The ensemble Kalman filter is used for atmospheric state estimation and the like.

CITATION LIST

Non Patent Literature

Non Patent Literature 1: Evensen Geir. Sequential data assimilation with a nonlinear quasi-geostrophic model using Monte Carlo methods to forecast error statistics. Journal of Geophysical Research: Oceans. Vol. 99, pp. 10143-10162. 1994.

SUMMARY OF INVENTION

Technical Problem

Even if the state variable assigned to each cell is originally 0, there is a possibility that a "positive bias" problem occurs in which the state variable does not become 0 but becomes a very small positive value such as 0.01. The larger the total number of cells, the greater the positive bias. In addition, there is a possibility that a "deviation from non-negative constraint" problem occurs in which a cell value which cannot take a negative value in the original observation data becomes a negative value due to the cell value fluctuating to a negative value in the state estimation. Further, as time goes by, the number of non-zero cells increases one or more times, so that there is a possibility that a problem of "increase in the number of non-zero cells", in which the calculation cost increases, occurs. Since the method described in Non Patent Literature 1 cannot avoid the occurrence of these problems, the calculation cost increases and the accuracy of the state estimation may decrease.

The present disclosure describes an analysis device capable of improving the accuracy of state estimation while reducing calculation cost.

Solution to Problem

An analysis device according to an aspect of the present disclosure is a device that inputs observation data related to an observation target and outputs estimated observation data. The analysis device includes: an input unit that inputs the observation data; a first conversion unit that generates first sequence data by applying a first conversion to the observation data; an estimation unit that obtains a current state variable by state estimation using a Kalman filter based on a state variable, the state variable being generated for the first sequence data, a state space model, and each element included in the first sequence data based on the state space model, the state space model being obtained by modeling a time-series variation of each element included in the first sequence data; an observation unit that generates second sequence data by applying an observation process using an observation matrix of the state space model to the current state variable; an elaboration unit that generates third sequence data by performing an elaboration process of correcting each element included in the second sequence data under a predetermined condition so that a value of each cell of the estimated observation data does not become a negative value and the number of cells having a value other than 0 included in the estimated observation data is suppressed; a second conversion unit that generates the estimated observation data by applying a second conversion that is an inverse conversion of the first conversion to the third sequence data; and an output unit that outputs the estimated observation data.

In this analysis device, modeling by the state space model and the state estimation by the Kalman filter are performed on the first sequence data generated by performing the first conversion on the observation data, not on the observation data itself. Since the first sequence data can take both positive and negative values, when an element which originally takes a value of 0 is not 0, it takes either a positive value or a negative value. Since these can be naturally cancelled out, the current state variable can be obtained while avoiding the occurrence of the "positive bias" problem. In the above analysis device, each element included in the second sequence data is corrected under the predetermined condition so that the value of each cell of the estimated observation data does not become a negative value and the number of cells having a value other than 0 included in the estimated observation data is suppressed. Therefore, the estimated observation data can satisfy the non-negative constraint, and the increase in the number of cells having a value of non-zero (other than 0) in the estimated observation data can be suppressed. As a result, it is possible to improve the accuracy of the state estimation while reducing the calculation cost.

Advantageous Effects of Invention

According to the present disclosure, it is possible to improve the accuracy of the state estimation while reducing the calculation cost.

DESCRIPTION OF EMBODIMENTS

In the following, an embodiment of the present disclosure will be described with reference to the drawings. It should be noted that in the description of the drawings, the same components are designated with the same reference signs, and the redundant description is omitted.

Figure 1:
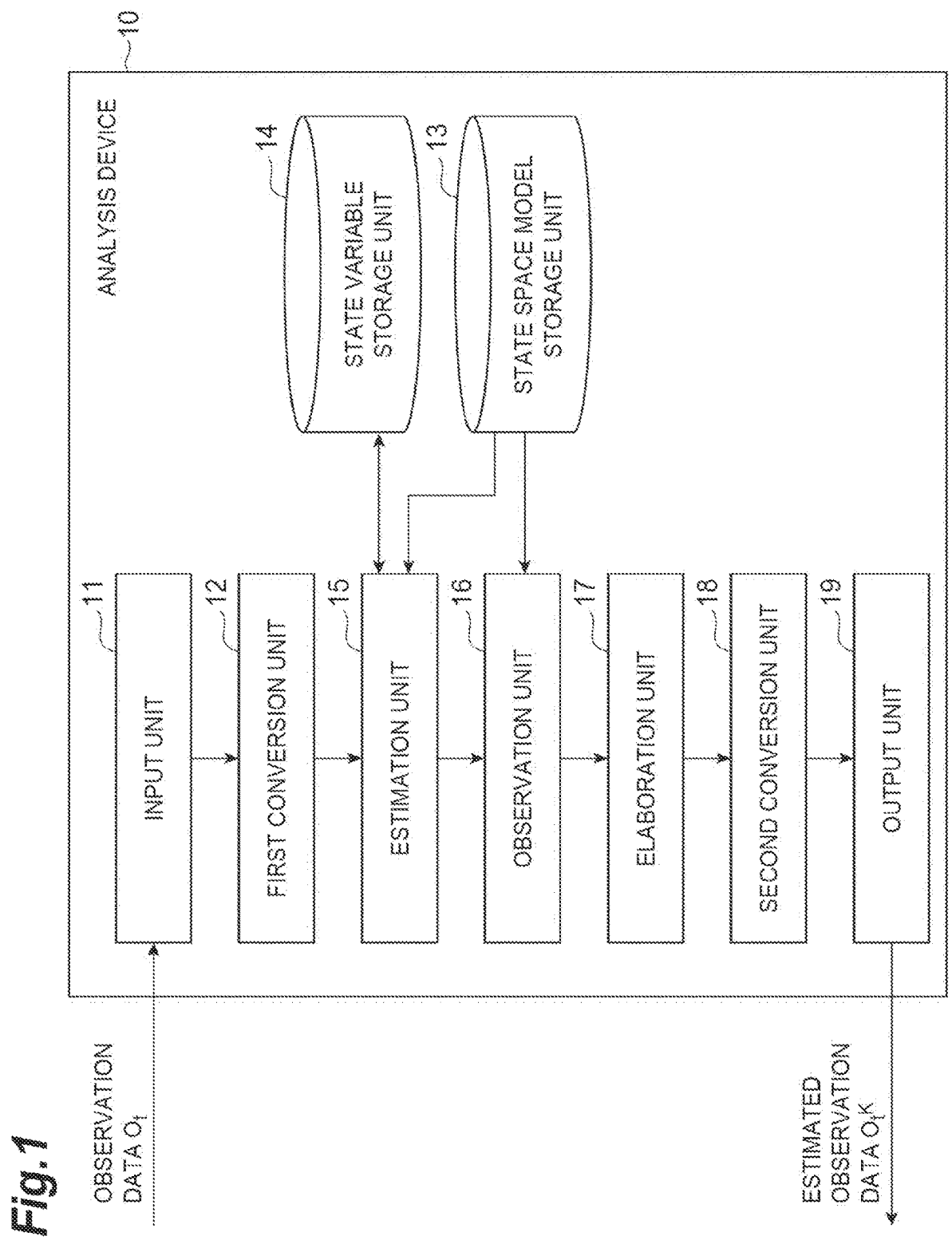
FIG. 1 is a diagram schematically showing a configuration of an analysis device according to an embodiment.

FIG. 1 is a diagram schematically showing a configuration of an analysis device according to an embodiment. An analysis device 10 shown in FIG. 1 is a device for inputting observation data $O_t$ at time t and outputting estimated observation data $O_t^K$. The analysis device 10 is constituted by, for example, an information processing device such as a server device. The time t is, for example, an integer value starting from 1. The time t increases by one each time a unit time (for example, 3,600 seconds) elapses. In other words, the time t is a period that continues for a unit time, and the period from the start to the end of the time t may be referred to as a period (current period). In order to promote the use of big data which is large-scale observation data obtained by observing events in the real world, the observation data $O_t$ is modeled by a state space model and a state estimation by a Kalman filter is performed. Details of the state space model and the Kalman filter will be described later.

The observation data $O_t$ is data relating to an observation target. The observation data $O_t$ is obtained by observing an observation target. Examples of observation targets include events in the real world. The observation data $O_t$ is a target of state estimation by the analysis device 10, and is a set of values (hereinafter referred to as a "cells") obtained by counting the number of records corresponding to a certain attribute or combination of attributes in data constituted by a set of records having one or more attributes. The observation data $O_t$ is generated, for example, from a database relating to the distribution of people at a certain time t. The estimated observation data $O_t^K$ is data obtained by performing the state estimation on the observation data $O_t$ by the analysis device 10. More specifically, the estimated observation data $O_t^K$ is data for which the state estimation is performed using the Kalman filter in which time series variation of each cell of the observation data $O_t$ is modeled by a state space model. Here, the observation data $O_t$ is expressed as $O_t=(o_1, o_2, \ldots, o_n)$, and the estimated observation data $O_t^K$ is expressed as $O_t^K=(o_1^K, o_2^K, \ldots, o_n^K)$. Let n be the total logical number of cells of the observation data $O_t$, and it is assumed that $n=2^k$ (k is a natural number). For convenience of description, a one dimensional data sequence is used as an object, but a multi-dimensional data sequence may be used. For example, the data sequence can be easily extended to multi-dimensional data sequence, such as by applying standard decomposition of wavelet transform.

Each value of the observation data $O_t$ and the estimated observation data $O_t^K$ is referred to as a "cell", and each value of first sequence data $W_t$, second sequence data $W_t^K$, and third sequence data $W_t^{K+}$ described later is referred to as an "element". That is, the value of the observation data $O_t$ and the value of the estimated observation data $O_t^K$ having the same meaning as the value of the observation data $O_t$ are referred to as "cell", and the value of the data obtained by converting the observation data $O_t$ is referred to as "element".

Functionally, the analysis device 10 includes an input unit 11, a first conversion unit 12, a state space model storage unit 13, a state variable storage unit 14, an estimation unit 15, an observation unit 16, an elaboration unit 17, a second conversion unit 18, and an output unit 19.

The input unit 11 receives an input of observation data $O_t$. The input unit 11 receives the observation data $O_t$ from the outside of the analysis device 10, and outputs the received observation data $O_t$ to the first conversion unit 12.

The first conversion unit 12 applies first conversion to the observation data $O_t$ to generate the first sequence data $W_t$. Here, the first conversion satisfies the condition that each element of the first sequence data $W_t$ generated by applying the first conversion can be expressed by a tree structure and that the value of each element of the first sequence data $W_t$ affects only the partial sum of the descendants in the tree. Examples of the first conversion include multiresolution analysis with Haar wavelet, multiresolution analysis with Nominal wavelet, Fourier transform, and sum-difference decomposition.

The following description will be made using multiresolution analysis (hereinafter referred to as "multiresolution analysis HW") using the Haar function as a mother wavelet as the first conversion. The Haar function is a kind of step function. This multiresolution analysis HW has an inverse conversion $HW^{-1}$ which is an inverse conversion function. For any observation data $O_t$, $O_t=HW^{-1}(HW(O_t))$ is true. The first conversion unit 12 uses the first conversion to convert the observation data $O_t$, which is a vector sequence of length n, into the first sequence data $W_t=(w_1, w_2, \ldots, w_n)$, which is a vector sequence of the same length n. The multiresolution analysis HW is realized by recursively applying the Haar decomposition $H_1$ k times. This Haar decomposition $H_1$ decomposes a vector sequence $Z=(z_1, z_2, \ldots, z_q)$ having a length $2^p$ (=q) into vector sequences cA and cD having a length $2^{p-1}$ as shown in the following Equations (1) to (3).

[Equation 1]
$$H_1(Z) = cA \mid cD \qquad (1)$$

[Equation 2]
$$cA = \left(\frac{z_1 + z_2}{2}, \frac{z_3 + z_4}{2}, \ldots, \frac{z_{2^p-1} + z_{2^p}}{2}\right) \qquad (2)$$

[Equation 3]
$$cD = \left(\frac{z_1 - z_2}{2}, \frac{z_3 - z_4}{2}, \ldots, \frac{z_{2^p-1} - z_{2^p}}{2}\right) \qquad (3)$$

The vector sequence cA is the vector of the mean of two adjacent values in the vector sequence Z. The vector sequence cD is a vector of a difference between two adjacent values in the vector sequence Z. The vector sequence cA is referred to as an approximate coefficient vector. The vector sequence cD is referred to as a detailed coefficient vector. When the Haar decomposition $H_1$ is performed again on the generated approximate coefficient vector cA, a set of an approximate coefficient vector of length $2^{p-2}$ and a detailed coefficient vector of length $2^{p-2}$ is obtained. As described above, as shown in Equations (4) and (5), the first conversion unit 12 repeats the Haar decomposition $H_1$ recursively k times with the observation data $O_t$ as an initial input, and finally obtains one approximate coefficient vector and k detailed coefficient vectors.

[Equation 4]

$$cA_0 = O_t \quad (4)$$

[Equation 5]

$$cA_i | cD_i = H_1(cA_{i-1}) \quad (5)$$

Here i takes an integer value of 2 to k. The approximate coefficient vector cA, and the detailed coefficient vector cD, are outputs obtained by the i-th Haar decomposition $H_1$, and these are referred to as coefficient vectors of level i. The x-th coefficient (hereinafter referred to as "element") of the approximate coefficient vector $cA_i$ of level i is expressed as $cA_{i,x}$, and the x-th coefficient (hereinafter referred to as "element") of the detailed coefficient vector $cD_i$ of level i is expressed as $cD_{i,x}$. Then, the first conversion unit 12 performs concatenation as shown in the following Equation (6) to form first sequence data $W_t$ which is a wavelet coefficient sequence.

[Equation 6]

$$w_t = (cA_k | cD_k | cD_{k-1} | \ldots | cD_1) \quad (6)$$

Note that the length of the approximate coefficient vector $cA_k$ of level k is 1, and the length of the detailed coefficient vector $cD_i$ of level i is $2^{k-i}$. Therefore, as shown in the following Equation (7), the length of the first sequence data $W_t$ is equal to the length of the observation data $O_t$.

[Equation 7]

$$|W_t| = 1 + \sum_{i=1}^{k} 2^{k-i} = 1 + \sum_{i=0}^{k-1} 2^i = 2^k = |O_t| \quad (7)$$

The state space model storage unit 13 stores (holds) model parameters of the state space model. The state space model is a model obtained by modeling time series variation of each element of the first sequence data $W_t$. The state space model includes a system model represented by Equation (8) and an observation model represented by Equation (9).

[Equation 8]

$$x_t = Fx_{t-1} + Gd \quad (8)$$

[Equation 9]

$$y_t = Hx_t + e \quad (9)$$

Here, the state $x_t$ is an m-dimensional vector representing a state of the system which cannot be directly observed from outside. The state $x_t$ is also referred to as a state variable. The system noise d is an s-dimensional normal white noise whose mean vector is 0 and which follows the variance-covariance matrix Q. The observation noise e is a b-dimensional normal white noise whose mean vector is 0 and which follows the variance-covariance matrix R. When the observed value of each element is a scalar, b=1 is true. The state transition matrix F is an m×m matrix. The variance matrix G is an m×s matrix. The observation matrix H is a b×m matrix.

That is, the state space model storage unit 13 stores the state transition matrix F, the variance matrix G, the observation matrix H, the variance-covariance matrix Q of the system noise d, and the variance-covariance matrix R of the observation noise e. In the present embodiment, these parameters are fixed values that are not changed with time t.

The state variable storage unit 14 stores (holds) a state variable for each element that may exist in the first sequence data $W_t$. The state variable storage unit 14 may store state variables for all elements that can exist logically in the first sequence data $W_t$. The state variable storage unit 14 may store state variables for only elements that have appeared at least once between time 0 and time t. The state variable storage unit 14 may store state variables for only elements whose number of occurrences or value size satisfies a predetermined condition. By adjusting the condition, the number of elements for which the state variable storage unit 14 stores a state variable is increased or decreased. By adjusting the number of elements, the calculation cost can be adjusted.

The number of state variables at time t is represented as $q_t$. By arranging the vectors of these $q_t$ state variables in the column direction, the state variable matrix $X_t^K$, which is an m×$q_t$ matrix, is obtained.

The state variable storage unit 14 stores (holds) the state variable matrix $X_{t-1}^K$ at the end of time t−1 at the start of time t. At time t=1, the state variable storage unit 14 stores the state variable matrix $X_0^K$ set to the initial state. The state variable matrix $X_0^K$ is obtained, for example, by generating an m-dimensional zero vector for each element existing in the first sequence data $W_1$ at time 1 and arranging these 0 vectors in the column direction. The state variable matrix $X_0^K$ may be generated in advance, for example, by analyzing the first sequence data $W_t$ for a certain period.

The estimation unit 15 generates a state variable (current state variable) at time t by performing state estimation by the Kalman filter based on the state space model and the state variable. Here, the state estimation by the Kalman filter will be described. In the state space model, the state variable $x_j$ at time j is estimated based on the time-series observed value $Y_t = \{y_1, y_2, \ldots, y_t\}$ obtained by the current time t. This problem is called prediction when the future state is estimated (j>t), filter when the current state is estimated (j=t), and smoothing when the past state is estimated (j<t). However, in the Kalman filter, only the prediction (j=t+1) after one period (one time) and the filter are handled.

In order to estimate these states, a conditional distribution $E(x_j|Y_t)$ relating to the state $x_j$ under the condition that the observed value $Y_t$ is given may be obtained. When considering a linear Gaussian model, the conditional distribution is defined by a mean vector and a variance-covariance matrix. Here, the mean vector $x_{j|t}$ and the variance-covariance matrix $V_{j|t}$ defining the conditional distribution $E(x_j|Y_t)$ are expressed by the following Equations (10) and (11), respectively.

[Equation 10]

$$x_{j|t} = E(x_j | Y_t) \quad (10)$$

[Equation 11]

$$V_{j|t} = E\{(x_j - x_{j|t})(x_j - x_{j|t})^T\} \quad (11)$$

The prediction after one period (one time) is expressed as a series of processes according to Equations (12) and (13). In Equations (12) and (13), the prediction after one period (time t) is performed based on the state $x_{t-1}$ obtained by time t−1.

[Equation 12]

$$x_{t|t-1} = F x_{t-1|t-1} \quad (12)$$

[Equation 13]

$$V_{t|t-1} = F V_{t-1|t-1} F^T + G Q G^T \quad (13)$$

The filter is expressed as a series of processes according to Equations (14) to (16) using the Kalman gain $K_t$.

[Equation 14]

$$K_t = V_{t|t-1} H^T (H V_{t|t-1} H^T + R)^{-1} \quad (14)$$

[Equation 15]

$$x_{t|t} = x_{t|t-1} + K_t (y_t - H x_{t|t-1}) \quad (15)$$

[Equation 16]

$$V_{t|t} = (I - K_t H) V_{t|t-1} \quad (16)$$

The state estimation process performed by the estimation unit 15 will be described in detail. The estimation unit 15 sets each element of the first sequence data $W_t$ as an observed value $y_t$ at time t in the state estimation by the Kalman filter for each element. The estimation unit obtains each parameter of the state space model from the state space model storage unit 13, and obtains a state variable matrix $X_{t-1}^K$ from the state variable storage unit 14. The estimation unit 15 executes a series of calculation processes shown in Equations (12) to (16) to obtain a current state variable matrix $X_t^K$ (state variable in this period).

Of the series of calculation processes, only the calculation of Equation (15) depends on the observed value $y_t$. That is, only the estimation of the state variable $x_t$ is affected by the observed value $y_t$, and the calculation of the variance-covariance matrix $V_t$ and the Kalman gain $K_t$ is not affected by the observed value $y_t$. Therefore, by using the state space model in common for all elements, the variance-covariance matrix $V_t$ becomes an m×1 matrix independent of the dimensionality of the observation data $O_t$. Similarly, the Kalman gain $K_t$ becomes an m×m matrix independent of the dimensionality of the observation data $O_t$. Furthermore, at the stage where the initial value (t=1) of the variance-covariance matrix $V_t$ is determined, the values of the variance-covariance matrix $V_t$ and the Kalman gain $K_t$ at time t can be calculated in advance. Therefore, the estimation unit 15 may calculate the values of the variance-covariance matrix $V_t$ and the Kalman gain $K_t$ in advance at the stage when the initial value (t=1) of the variance-covariance matrix $V_t$ is determined. In this case, at time t (t>1), the estimation unit 15 may omit calculations related to the variance-covariance matrix $V_t$ and the Kalman gain $K_t$ according to Equations (13), (14), and (16).

When a common state space model is used for all elements, the calculations of Equations (12) and (15) must be performed sequentially for each increment of time t. The estimation unit 15 may calculate Equations (12) and (15) at one time by the following Equations (17) and (18), respectively.

[Equation 17]

$$X_{t|t-1}^K = F X_{t-1|t-1}^K \quad (17)$$

[Equation 18]

$$X_{t|t}^K = X_{t|t-1}^K + K_t (W_t - H X_{t|t-1}^K) \quad (18)$$

As described above, the estimation unit 15 obtains a state variable matrix $X_{t|t-1}^K$ that summarizes the result of prediction of the state variable after one period (one time) and a state variable matrix $X_{t|t}^K$ that summarizes the result of the filter while reflecting the value of each element of the first sequence data $W_t$ in the state estimation of the state variable corresponding to each element. Since the subsequent processes are common to the state variable matrix $X_{t|t-1}^K$ and the state variable matrix $X_{t|t}^K$, these will be referred to as "$X_t^K$" in the description. In the following processes, which result is used depends on the purpose of use, but both results may be used. The estimation unit 15 updates the state variable matrix $X_{t-1}^K$ stored in the state variable storage unit 14 to the generated state variable matrix $X_t^K$. When both the state variable matrix $X_{t|t-1}^K$ and the state variable matrix $X_{t|t}^K$ are used, the state variable storage unit 14 stores the state variable matrix $X_{t|t-1}^K$ and the state variable matrix $X_{t|t}^K$.

The observation unit 16 generates the second sequence data $W_t^K$ which is a wavelet coefficient sequence to which the Kalman filter is applied by applying an observation process using the observation matrix H to the current state variable matrix $X_t^K$. This observation process is executed by the following Equation (19).

[Equation 19]

$$W_t^K = H X_t^K = (cA_k^K | cD_k^K | cD_{k-1}^K | ... | cD_1^K) \quad (19)$$

The elaboration unit 17 executes an elaboration process to generate the third sequence data $W_t^{K+}$. The elaboration process is a process of correcting each element included in the second sequence data $W_t^K$ under a predetermined condition so that each cell of the estimated observation data $O_t^K$ has a value of 0 or more and the number of cells having a value other than 0 is suppressed. Here, the third sequence data $W_t^{K+}$ satisfies the non-negative constraint. For example, the elaboration unit 17 verifies each of the estimated wavelet coefficients included in the second sequence data $W_t^K = (cA_k^K | cD_k^K | cD_{k-1}^K | ... | cD_1^K)$, and corrects an element that deviates from the non-negative constraint and an element that increases the number of cells having a value other than 0 included in the estimated observation data $O_t^K$ when the element exists. Then, the elaboration unit 17 verifies and corrects all elements from level k to level 1, thereby obtaining the third sequence data $W_t^{K+} = (cA_k^{K+} | cD_k^{K+} | cD_{k-1}^{K+} | ... | cD_1^{K+})$ which is an elaborated wavelet coefficient sequence that is guaranteed to satisfy the non-negative constraint and can suppress the number of cells having a value other than 0 included in the estimated observation data $O_t^K$.

The function of the elaboration unit 17 will be described in detail. In the description of the elaboration unit 17, i takes an integer value from 0 to k. At this time, the estimated observation data $O_t^K = cA_0^{K+}$ is true. The elaboration unit 17 elaborates the value of each element of an estimated detailed coefficient vector $cD_{i+1}^K$ of a level (i+1) so that all elements of an elaborated approximate coefficient vector $cA_i^{K+}$ of level i do not take negative values and that elements of an elaborated approximate coefficient vector $cA_{i+1,x}^{K+}$ of level (i+1) that do not substantially affect $cA_0^{K+}$ are pruned. Note that pruning an element means stopping the processing of the element.

First, the elaboration unit 17 executes the following Equation (20) so that an elaborated approximate coefficient vector $cA_k^{K+}$ of level k satisfies the non-negative constraint at i=k.

[Equation 20]
$$cA_{k,1}^{K+} = \max(cA_{k,1}^K, 0) \tag{20}$$

At i<k, each element $cA_{i,x}^{K+}$ of the elaborated approximate coefficient vector $cA_i^{K+}$ of level i is defined recursively as shown in Equation (21) using an element $cA_{i+1,ceil(x/2)}^{K+}$ of an elaborated approximate coefficient vector $cA_{i+1}^{K+}$ and an element $cD_{i+1,ceil(x/2)}^{K+}$ of an elaborated detailed coefficient vector $cD_{i+1}^{K+}$ of level i+1 above one level.

[Equation 21]
$$cA_{i,x}^{K+} = cA_{i+1,ceil(\frac{x}{2})}^{K+} + g(x) \times cD_{1+1,ceil(\frac{x}{2})}^{K+} \tag{21}$$

Where ceil(x) is a ceiling function and represents the smallest integer not less than x (i.e., rounding up x to the nearest whole number). g(x) is a sign function and takes a value shown in Equation (22) below.

[Equation 22]
$$g(x) = \begin{cases} +1 & (x = 1 (\mathrm{mod} 2)) \\ -1 & (x = 0 (\mathrm{mod} 2)) \end{cases} \tag{22}$$

That is, according to Equation (21), Equation (24) is true if the following Equation (23) can be satisfied.

[Equation 23]
$$\left| cD_{i+1,ceil(\frac{x}{2})}^{K+} \right| \leq cA_{i+1,ceil(\frac{x}{2})}^{K+} \tag{23}$$

[Equation 24]
$$cA_{i,x}^{K+} \geq 0 \tag{24}$$

Since the estimated observation data $O_t^K = cA_0^{K+}$ is true, if the elaborated approximate coefficient vector $cA_k^{K+}$ of level k is 0 or more and Equation (23) is satisfied for all elements of the third sequence data $W_t^{K+}$, the estimated observation data $O_t^K$ does not deviate from the non-negative constraint.

Next, the process of suppressing the number of cells having a value other than 0 in the estimated observation data $O_t^K$ performed by the elaboration unit 17 will be specifically described. Since each element $cA_{i,x}^{K+}$ of the elaborated approximate coefficient vector $cA_i^{K+}$ of level i is a mean of a set of $2^i$ cell values in the estimated observation data $O_t^K$, the magnitude $Ef(cA_{i,x}^{K+})$ of the influence value of each element $cA_{i,x}^{K+}$ on the estimated observation data $O_t^K$ can be obtained from the following Equation (25).

[Equation 25]
$$Ef(cA_{i,x}^{K+}) = cA_{i,x}^{K+} \times 2^i \tag{25}$$

Here, particularly in the element $cA_{i,x}^{K+}$ that satisfies $Ef(cA_{i,x}^{K+}) \leq 0.5$, there is no substantial difference in the estimated observation data $O_t^K$ even if the element $cA_{i,x}^{K+}$ is directed to any subtree by the following Equations (26) and (27) and the processing for the subtree that becomes 0 value is pruned (stopped). Note that when $Ef(cA_{i,x}^{K+})$ is 0.5 or less, the partial sum of the region is preserved even if the element $cA_{i,x}^{K+}$ is directed to any subtree.

[Equation 26]
$$cA_{i,x}^{K+} = cA_{i+1,ceil(\frac{x}{2})}^{K+} + g(x) \times cD_{i+1,ceil(\frac{x}{2})}^{K+} \quad (i \neq k) \tag{26}$$

[Equation 27]
$$cD_{i,x}^{K+} = \begin{cases} rand(1, -1) \times cA_{i,x}^{K+} & \text{if } (Ef(cA_{i,x}^{K+}) \leq 0.5) \\ cD_{i,x}^K & \text{else} \end{cases} \tag{27}$$

Here, rand(x, y) is a function which takes x or y at random.

Therefore, the elaboration unit 17 calculates each element $cD_{i,x}^{K+}$ of the elaborated detailed coefficient vector $cD_i^{K+}$ of level i (i=1 to k) using the following Equation (28).

[Equation 28]
$$cD_{i,x}^{K+} = \begin{cases} -cA_{i,x}^{K+} & \text{if } (cD_{i,x}^K < -cA_{i,x}^{K+}) \\ cA_{i,x}^{K+} & \text{else if } (cD_{i,x}^K > cA_{i,x}^{K+}) \\ rand(1, -1) \times cA_{i,x}^{K+} & \text{else if } (Ef(cA_{i,x}^{K+}) \leq 0.5) \\ cD_{i,x}^K & \text{else} \end{cases} \tag{28}$$

As described above, the elaboration unit 17 sequentially calculates the elements $cA_{i,x}^{K+}$ and $cD_{i,x}^{K+}$ of the element numbers x=1 to $2^{k-i}$ in descending order from k to 1 with respect to i using the Equations (20), (21) and (28). Through these calculations, the elaboration unit 17 obtains the third sequence data $W_t^{K+} = (cA_k^{K+} | cD_k^{K+} | cD_{k-1}^{K+} | \ldots | cD_1^{K+})$ such that the estimated observation data $O_t^K$ does not deviate from the non-negative constraint and the number of cells having a value other than 0 included in the estimated observation data $O_t^K$ is suppressed.

The second conversion unit 18 generates the estimated observation data $O_t^K$ by applying a second conversion which is an inverse conversion of the first conversion to the third sequence data $W_t^{K+}$. When the multiresolution analysis using the Haar function as the mother wavelet is used as the first conversion, the second conversion unit 18 uses the inverse conversion $HW^{-1}$ of the multiresolution analysis using the Haar function as the mother wavelet as the second conversion. The second conversion unit 18 applies the second conversion to the third sequence data $W_t^{K+}$, which is an elaborated wavelet coefficient sequence, to generate the estimated observation data $O_t^K$. That is, the second conversion unit 18 calculates $O_t^K = HW^{-1}(W_t^{K+})$.

Although the above-described calculation is generally known, the second conversion unit 18 calculates the elaborated approximate coefficient vector $cA_i^{K+}$ by using the Equation (21) recursively from k−1 to 0 for i with the third sequence data $W_t^{K+}$ as an input, for example. Since the estimated observation data $O_t^K = cA_0^{K+}$ is true, the second conversion unit 18 obtains the estimated observation data $O_t^K$ by obtaining the elaborated approximate coefficient vector $cA_0^{K+}$ of level 0.

The output unit 19 outputs the estimated observation data $O_t^K$. The output unit 19 receives the estimated observation data $O_t^K$ from the second conversion unit 18, and outputs the received estimated observation data $O_t^K$ to the outside of the analysis device 10.

Figure 2:
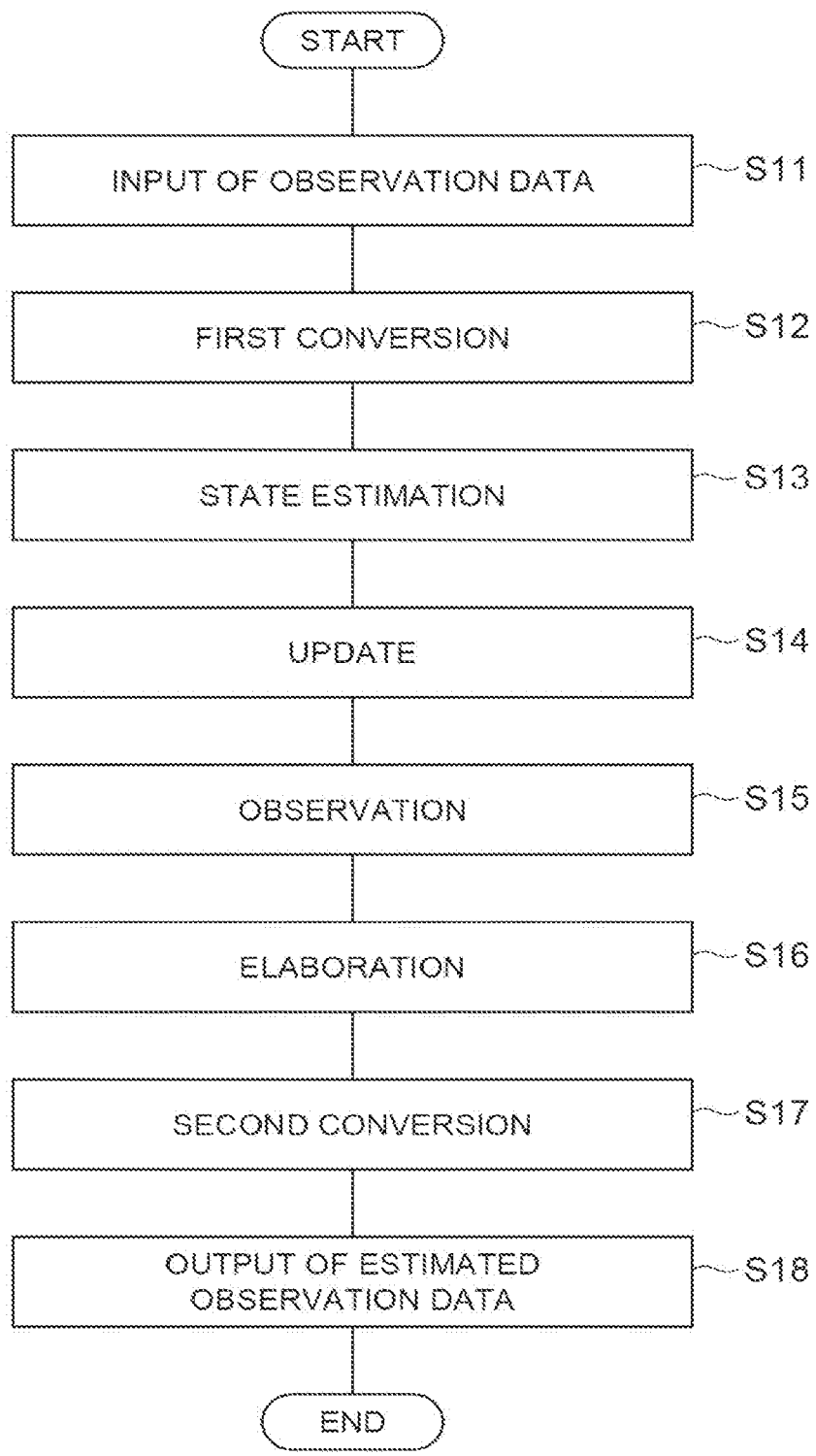
FIG. 2 is a flowchart showing a series of processes of an analysis method performed by the analysis device shown in FIG. 1.

Next, an analysis method performed by the analysis device 10 at time t will be described with reference to FIG. 2. FIG. 2 is a flowchart showing a series of processes of an analysis method performed by the analysis device shown in FIG. 1. The series of processes shown in FIG. 2 is started, for example, by inputting observation data $O_t$ from the outside the analysis device 10. The observation data $O_t$ is repeatedly input every time a unit time elapses.

As shown in FIG. 2, first, the input unit 11 receives the observation data $O_t$ from the outside of the analysis device 10 (step S11). Then, the input unit 11 outputs the observation data $O_t$ to the first conversion unit 12.

Subsequently, when the first conversion unit 12 receives the observation data $O_t$ from the input unit 11, the first conversion unit 12 applies the first conversion to the observation data $O_t$ to generate the first sequence data $W_t$ (step S12). Examples of the first conversion include multiresolution analysis with Haar wavelet, multiresolution analysis with Nominal wavelet, Fourier transform, and sum-difference decomposition. Then, the first conversion unit 12 outputs the first sequence data $W_t$ to the estimation unit 15.

Subsequently, when the estimation unit 15 receives the first sequence data $W_t$ from the first conversion unit 12, the estimation unit acquires each parameter of the state space model from the state space model storage unit 13, and acquires the state variable matrix $X_{t-1}^K$ from the state variable storage unit 14. Then, the estimation unit 15 obtains the current state variable matrix $X_t^K$ by performing the state estimation by the Kalman filter using the first sequence data $W_t$, each parameter of the state space model, and the state variable matrix $X_{t-1}^K$ (step S13).

Subsequently, the estimation unit 15 updates the state variable matrix $X_{t-1}^K$ stored in the state variable storage unit 14 to the current state variable matrix $X_t^K$ (step S14). Then, the estimation unit 15 outputs the current state variable matrix $X_t^K$ to the observation unit 16.

Subsequently, when the observation unit 16 receives the current state variable matrix $X_t^K$ from the estimation unit 15, the observation unit 16 acquires the observation matrix H from the state space model storage unit 13. Then, the observation unit 16 applies the observation processing using the observation matrix H to the current state variable matrix $X_t^K$ to generate the second sequence data $W_t^K$ (step S15). Then, the observation unit 16 outputs the second sequence data $W_t^K$ to the elaboration unit 17.

Subsequently, when the elaboration unit 17 receives the second sequence data $W_t^K$ from the observation unit 16, the elaboration unit 17 executes the elaboration process to generate the third sequence data $W_t^{K+}$ (step S16). The elaboration process is a process for correcting each element included in the second sequence data $W_t^K$ under a predetermined condition so that each cell of the estimated observation data $O_t^K$ does not have a negative value and the number of cells having a value other than 0 included in the estimated observation data $O_t^K$ is suppressed. Then, the elaboration unit 17 outputs the third sequence data $W_t^{K+}$ to the second conversion unit 18.

Subsequently, when the second conversion unit 18 receives the third sequence data $W_t^{K+}$ from the elaboration unit 17, the second conversion unit 18 applies the second conversion to the third sequence data $W_t^{K+}$ to generate the estimated observation data $O_t^K$ (step S17). Then, the second conversion unit 18 outputs the estimated observation data $O_t^K$ to the output unit 19.

Subsequently, when the output unit 19 receives the estimated observation data $O_t^K$ from the second conversion unit 18, the output unit 19 outputs the estimated observation data $O_t^K$ to the outside of the analysis device 10 (step S18). Thus, the series of processes of the analysis method at time t is completed.

Note that step S14 may be performed at any timing in the series of processes at time t, as long as it is after step S13.

Next, the operation and effect of the analysis device 10 will be described. When the observation data $O_t$ is a natural number, if a cell which originally takes a value of 0 does not become 0, the cell takes a positive value. When modeling by the state space model and the state estimation by the Kalman filter are performed on the observation data $O_t$ in which a plurality of cells are originally 0 but take positive values, the "positive bias" problem occurs. However, in the analysis device 10, modeling by the state space model and the state estimation by the Kalman filter are performed not on the observation data $O_t$ itself but on the first sequence data $W_t$ generated by performing the first conversion on the observation data $O_t$. Since the first sequence data $W_t$ can take both positive and negative values, when an element which originally takes a value of 0 is not 0, the element takes either a positive value or a negative value. In a case where a plurality of elements originally take a value of 0, the values of these elements can naturally be cancelled out. Therefore, it is possible to obtain the state variable matrix $X_t^K$ by avoiding the occurrence of the "positive bias" problem.

In the analysis device 10, each element included in the second sequence data $W_t^K$ is corrected under the predetermined condition so that the value of each cell of the estimated observation data $O_t^K$ does not become a negative value and the number of cells having a value other than 0 included in the estimated observation data $O_t^K$ is suppressed. Therefore, the estimated observation data $O_t^K$ can satisfy the non-negative constraint, and it is also possible to suppress an increase in the number of cells having a value of non-zero (other than 0) in the estimated observation data $O_t^K$. As a result, it is possible to improve the accuracy of the state estimation while reducing the calculation cost.

In order to avoid the problems of "positive bias", "deviation from non-negative constraint", and "increase in the number of non-zero cells", a technique of deleting a state variable vector with respect to a cell below a threshold value may be considered. However, since the state variable vector of a cell which originally has a very small value is deleted, an "under-bias" problem may occur in which the partial sum accuracy of a region is deteriorated. On the other hand, in the analysis device 10, when the magnitude $Ef(cA_{i,x}^{K+})$ of the influence value of the element $cA_{i,x}^{K+}$ included in the second sequence data $W_t^K$ on the estimated observation data $O_t^K$ is small, the element $cA_{i,x}^{K+}$ is directed to any subtree. In this case, since the partial sum of the region is preserved, it is possible to prevent deterioration of the partial sum accuracy due to an under-bias while suppressing an increase in the number of non-zero cells.

The first conversion may be multi-resolution analysis using the Haar function as the mother wavelet. In this case, each element of the first sequence data $W_t$ generated by applying the first conversion can be expressed by a tree structure, and the value of each element of the first sequence data $W_t$ affects only the partial sum of the descendants in the tree. Therefore, it is ensured that all the elements expressed in the tree structure satisfy the non-negative constraint when the trace reaches the lowest level of the tree only by tracing the tree from the upper level of the tree to elaborate each element so as to satisfy the non-negative constraint. This makes it possible to simplify the calculation in the elaboration process.

The estimation unit 15 updates the state variable matrix $X_{t-1}^K$ stored in the state variable storage unit 14 to the current state variable matrix $X_t^K$. According to this configuration, the state variable matrix is updated every time the state estimation is performed. Therefore, since the state estimation is performed using the latest state variable matrix, the accuracy of the state estimation can be improved.

Although embodiments of the present disclosure have been described above, the present disclosure is not limited to the above-described embodiments.

The analysis device 10 may be configured by a single device coupled physically or logically, or may be configured by two or more devices that are physically or logically separated from each other. For example, the analysis device 10 may be implemented by a plurality of computers distributed over a network such as cloud computing. As described above, the configuration of the analysis device 10 may include any configuration that can realize the functions of the analysis device 10.

The analysis device 10 may not include the state space model storage unit 13. That is, the state space model storage unit 13 may be provided outside the analysis device 10. The analysis device 10 may not include the state variable storage unit 14. That is, the state variable storage unit 14 may be provided outside the analysis device 10.

The first conversion unit 12 may express the observation data $O_t$ and the first sequence data $W_t$ in a sparse data format. That is, the first conversion unit 12 may express the observation data $O_t$ in a sparse data format, and may generate the first sequence data $W_t$ by applying the first conversion to cells having a value of non-zero (other than 0) among cells included in the observation data $O_t$. The first conversion unit 12 expresses the observation data $O_t$ and the first sequence data $W_t$ in the sparse data format capable of efficiently expressing the sparse matrix. Examples of such sparse data formats include a COO (Coordinate) format and a format in which an element having a value of 0 is not explicitly expressed. In this case, since the application of the first conversion, the state estimation, the observation process, the elaboration process and the second conversion to the cells having a value of 0 is omitted, the calculation amount can be reduced.

The first conversion unit 12 may further perform an adjustment process on the values of each element of data generated by applying the first conversion to the observation data $O_t$ to generate the first sequence data $W_t$. The adjustment process is a process of correcting each value under a predetermined condition so that the scales of the magnitudes of the values of elements included in the data generated by applying the first conversion to the observation data $O_t$ are unified at the same level.

For example, when multiresolution analysis using the Haar function as the mother wavelet is used as the first conversion, the generated wavelet coefficient sequence is a difference between means of adjacent cells or neighboring cells. Here, when the observation data $O_t$ is sparse, as the level of decomposition increases, the value of the approximate coefficient vector cA, which is an input of the Haar decomposition at each level decreases. The first conversion unit 12 obtains the adjusted wavelet coefficients by performing the calculations shown in the following Equations (29) and (30), for example, and obtains the first sequence data $W_t$ by concatenating them as shown in Equation (6).

[Equation 29]
$$cA_{k,1} = cA_{k,1} \times 2^{k/2} \tag{29}$$

[Equation 30]
$$cD_{i,x} = cD_{i,x} \times 2^{i/2} \tag{30}$$

Further, the observation unit 16 may perform an inverse adjustment process on the values of the elements of the data generated by applying the observation process using the observation matrix H to the current state variable $X_t^K$, thereby generating the second sequence data $W_t^K$. The inverse adjustment process is a process for correcting each value under a predetermined condition so that the scale of the magnitude of the value of each element included in the data generated by applying the observation process using the observation matrix H to the current state variable $X_t^K$ is returned to the scale before the adjustment process.

For example, after applying the Equation (19), the observation unit 16 performs calculations shown in the following Equations (31) and (32) to obtain the inverse-adjusted wavelet coefficients, and concatenates them as shown in Equation (6) to obtain the second sequence data $W_t^K$.

[Equation 31]
$$cA_{k,1}^K = cA_{k,1}^K \times 2^{-k/2} \tag{31}$$

[Equation 32]
$$cD_{i,x}^K = cD_{i,x}^K \times 2^{-i/2} \tag{32}$$

In the above-described configuration, even if the observation data $O_t$ is sparse data including a large number of cells having a value of 0, the scale of the value of each element of the first sequence data $W_t$ is adjusted to the same level. Therefore, the accuracy of the state estimation by the Kalman filter can be improved.

Note that the block diagrams used in the description of the above embodiments show blocks of functional units. These functional blocks (components) are realized by any combination of at least one of hardware and software. The method for realizing each functional block is not particularly limited. That is, each functional block may be realized using a single device coupled physically or logically. Alternatively, two or more devices that are physically or logically separated from each other may be directly or indirectly connected (e.g., wired, wireless, etc.) to each other, and each functional block may be realized using these devices. The functional blocks may be realized by combining the one device or the plurality of devices mentioned above with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning, and the like. However, the functions are not limited thereto. For example, a functional block (component) that causes transmitting is called a transmitting unit or a transmitter. For any of the above, as explained above, the realization method is not particularly limited to any one method.

Figure 3:
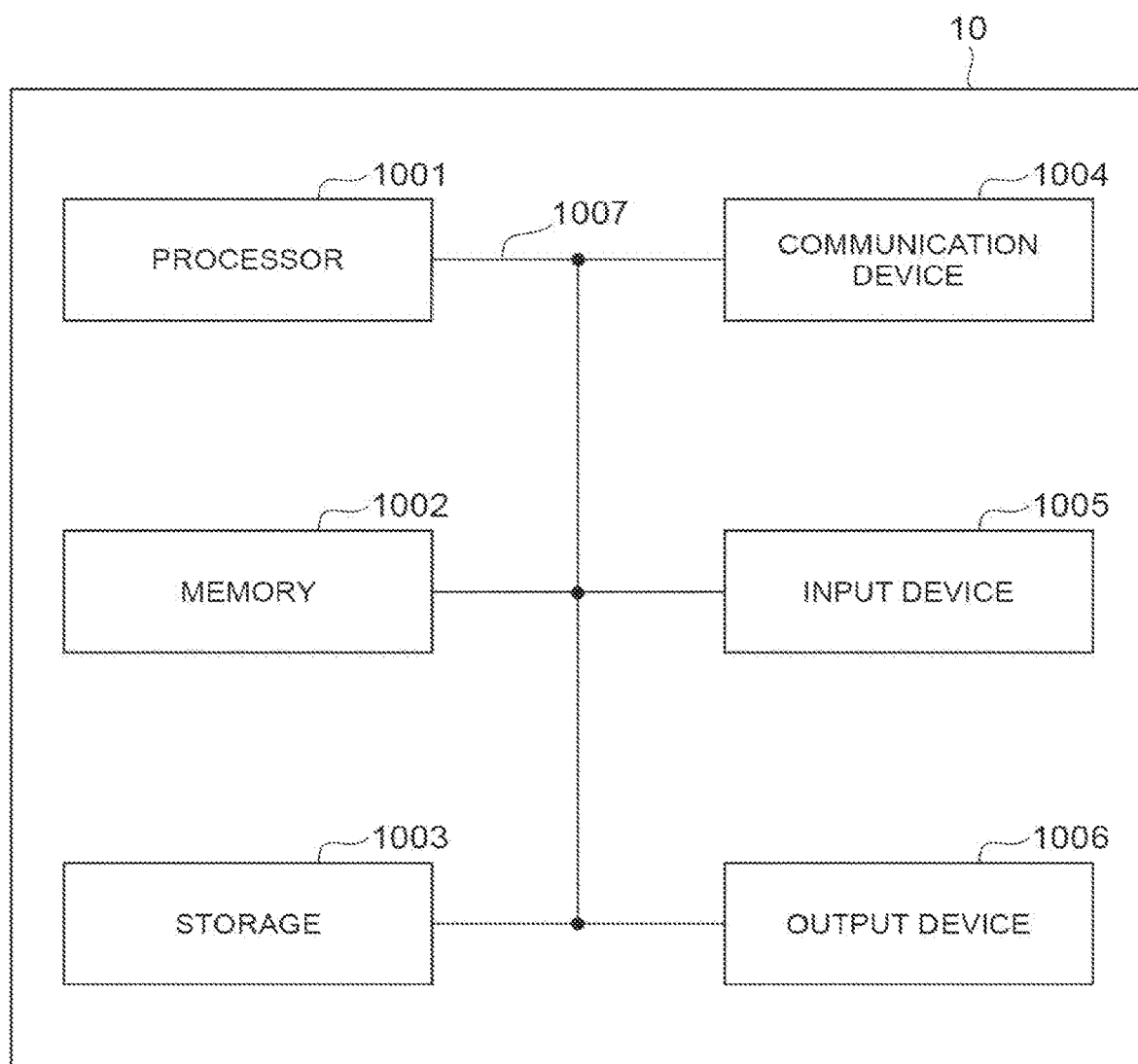
FIG. 3 is a diagram showing a hardware configuration of the analysis device shown in FIG. 1.

For example, the analysis device 10 according to one embodiment of the present disclosure may function as a computer performing the processes of the present disclosure. FIG. 3 is a diagram showing an example of the hardware configuration of the analysis device 10 according to the embodiment of the present disclosure. The above-described analysis device 10 may be physically configured as a computer device including a processor 1001, a memory 1002, a storage 1003, a communication device 1004, an input device 1005, an output device 1006, a bus 1007, and the like.

In the following description, the term "device" can be replaced with a circuit, a device, a unit, etc. The hardware configuration of the analysis device 10 may be configured to include one or more of the devices shown in the figure, or may be configured not to include some of the devices.

Each function of the analysis device 10 is realized by causing the processor 1001, by loading predetermined software (program) onto hardware such as the processor 1001 and the memory 1002, to perform computation to control the communication via the communication device 1004 and to control at least one of reading data from and writing data to the memory 1002 and the storage 1003.

The processor 1001 operates, for example, an operating system to control the entire computer. The processor 1001 may be configured by a central processing unit (CPU) including an interface with a peripheral device, a controller, an arithmetic unit, a register, and the like. For example, each function of the above-described analysis device 10 may be realized by the processor 1001.

The processor 1001 reads a program (program code), a software module, data, and the like from at least one of the storage 1003 and the communication device 1004 into the memory 1002, and executes various processes in accordance with these. As the program, a program for causing a computer to execute at least a part of the operations described in the above-described embodiments is used. For example, each function of the analysis device 10 may be realized by a control program stored in the memory 1002 and operating in the processor 1001. Although it has been described that the various processes described above are executed by a single processor 1001, the various processes may be executed simultaneously or sequentially by two or more processors 1001. The processor 1001 may be implemented by one or more chips. The program may be transmitted from a network via a telecommunication line.

The memory 1002 is a computer-readable recording medium, and, for example, may be configured by at least one of a read only memory (ROM), an erasable programmable ROM (EPROM), an electrically erasable programmable ROM (EEPROM), a random access memory (RAM) and the like. The memory 1002 may be referred to as register, cache, main memory (main storage) or the like. The memory 1002 can store executable programs (program codes), software modules, and the like for performing the analysis method according to the embodiment of the present disclosure.

The storage 1003 is a computer-readable recording medium, and, for example, may be configured by at least one of an optical disk such as a compact disc ROM (CD-ROM), a hard disk drive, a flexible disk, a magneto-optical disk (e.g., a compact disk, a digital versatile disk, a Blu-ray (Registered Trademark) disk), a smart card, a flash memory (e.g., a card, a stick, a key drive), a floppy disk (Registered Trademark), a magnetic strip, and the like. The storage 1003 may be referred to as auxiliary storage. The storage medium described above may be, for example, a database, a server, or any other suitable medium that includes at least one of memory 1002 and storage 1003.

The communication device 1004 is hardware (transmission/reception device) for performing communication between computers through at least one of a wired network and a wireless network, and is also referred to as a network device, a network controller, a network card, a communication module, or the like. The communication device 1004 may include, for example, a high-frequency switch, a duplexer, a filter, a frequency synthesizer, and the like to realize at least one of frequency division duplex (FDD) and time division duplex (TDD). For example, the input unit 11, the output unit 19, and the like described above may be realized by the communication device 1004.

The input device 1005 is an input device (e.g., a keyboard, a mouse, a microphone, a switch, a button, a sensor, or the like) that accepts input from the outside. The output device 1006 is an output device (e.g., display, speaker, LED lamp, etc.) that performs an output to the outside. The input device 1005 and the output device 1006 may be integrated (e.g., a touch panel).

Devices such as the processor 1001 and the memory 1002 are connected to each other with the bus 1007 for communicating information. The bus 1007 may be configured using a single bus or using a separate bus for every two devices.

The analysis device 10 may include hardware such as a microprocessor, a digital signal processor (DSP), an application specific integrated circuit (ASIC), a programmable logic device (PLD), a field programmable gate array (FPGA). Some or all of each functional block may be realized by the hardware. For example, the processor 1001 may be implemented using at least one of such hardware components.

Notification of information is not limited to the aspects/embodiments described in the present disclosure, and may be performed using other methods.

In the processing procedures, sequences, flowcharts, and the like of each of the aspects/embodiments described in the present disclosure, the order of processing may be interchanged, as long as there is no inconsistency. For example, the various steps of the methods described in the present disclosure are presented using exemplary order and are not limited to the particular order presented.

Information and the like may be output from an upper layer to a lower layer or may be output from a lower layer to an upper layer. Information and the like may be input and output via a plurality of network nodes.

The input/output information and the like may be stored in a specific location (e.g., a memory) or may be managed using a management table. The information to be input/output and the like can be overwritten, updated, or added. The output information and the like may be deleted. The input information and the like may be transmitted to another device.

The determination may be performed by a value (0 or 1) represented by one bit, a truth value (Boolean: true or false), or a comparison of a numerical value (for example, a comparison with a predetermined value).

The aspects/embodiments described in the present disclosure may be used separately, in combination, or switched with the execution of each aspect/embodiment. The notification of the predetermined information (for example, notification of "being X") is not limited to being performed explicitly, and may be performed implicitly (for example, without notifying the predetermined information).

Although the present disclosure has been described in detail above, it is apparent to those skilled in the art that the present disclosure is not limited to the embodiments described in the present disclosure. The present disclosure may be implemented as modifications and variations without departing from the spirit and scope of the present disclosure as defined by the claims. Accordingly, the description of the present disclosure is for the purpose of illustration and has no restrictive meaning relative to the present disclosure.

Software, whether referred to as software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, etc.

Software, an instruction, information, and the like may be transmitted and received via a transmission medium. For example, if software is transmitted from a website, a server, or any other remote source using at least one of wired technologies (such as a coaxial cable, an optical fiber cable, a twisted pair, and a digital subscriber line (DSL)) and wireless technologies (such as infrared light and microwaves), at least one of these wired and wireless technologies is included within the definition of a transmission medium.

The information, signals, and the like described in the present disclosure may be represented using any of a variety of different technologies. For example, data, instructions, commands, information, signals, bits, symbols, chips, etc., which may be referred to throughout the above description, may be represented by voltages, currents, electromagnetic waves, magnetic fields or particles, optical fields or photons, or any combination thereof.

It should be noted that terms described in the present disclosure and terms necessary for understanding the present disclosure may be replaced with terms having the same or similar meanings.

The terms "system" and "network" as used in the present disclosure are used interchangeably.

The information, parameters, and the like described in the present disclosure may be expressed using absolute values, relative values from a predetermined value, or other corresponding information.

The names used for the parameters described above are in no way restrictive. Further, the mathematical expressions and the like using these parameters may be different from the contents explicitly disclosed in the present disclosure.

The term "determining" as used in the present disclosure may encompass a wide variety of operations. The "determining" may include, for example, judging, calculating, computing, processing, deriving, investigating, looking up, search, inquiry (e.g., searching in a table, a database, or another data structure), and ascertaining. The "determining" may include receiving (e.g., receiving information), transmitting (e.g., transmitting information), input, output, and accessing (e.g., accessing data in a memory). The "determining" may include resolving, selecting, choosing, establishing, and comparing. That is, the "determining" may include some operations that may be considered as the "determining". The "determining" may be read as "assuming", "expecting", "considering", etc.

The term "connected", "coupled", or any variation thereof means any direct or indirect connection or coupling between two or more elements. One or more intermediate elements may be present between two elements that are "connected" or "coupled" to each other. The coupling or connection between the elements may be physical, logical, or a combination thereof. For example, "connection" may be read as "access". When "connect" or "coupling" is used in the present disclosure, the two elements to be connected or coupled can be considered to be "connected" or "coupled" to each other using one or more electrical wires, cables, printed electrical connections, and as some non-limiting and non-exhaustive example, electromagnetic energy having wavelengths in the radio frequency region, the microwave region, and light (both visible and invisible) regions.

The term "based on" as used in the present disclosure does not mean "based only on" unless otherwise specified. In other words, the term "based on" means both "based only on" and "based at least on".

Any reference to an element using the designations "first", "second", etc., as used in the present disclosure does not generally limit the amount or order of the element. Such designations may be used in the present disclosure as a convenient way to distinguish between two or more elements. Thus, references to the first and second elements do not imply that only two elements may be adopted, or that the first element must precede the second element in any way.

The "unit" in the configuration of each of the above devices may be replaced with "circuit", "device", etc.

When "include", "including", and variations thereof are used in the present disclosure, these terms are intended to be inclusive, as well as the term "comprising". Furthermore, the term "or" as used in the present disclosure is intended not to be an exclusive OR.

In the present disclosure, where article such as "a", "an" and "the" in English is added by translation, the present disclosure may include that the noun following the article is plural.

In the present disclosure, the term "A and B are different" may mean that "A and B are different from each other". The term may mean that "each of A and B is different from C". Terms such as "separated" and "combined" may also be interpreted in a similar manner to "different".

REFERENCE SIGNS LIST

10 Analysis device
11 Input unit
12 First conversion unit
13 State space model storage unit
14 State variable storage unit
15 Estimation unit
16 Observation unit
17 Elaboration unit
18 Second conversion unit
19 Output unit
1001 Processor
1002 Memory
1003 Storage
1004 Communication device
1005 Input device
1006 Output device
1007 Bus

The invention claimed is:

1. An analysis device that inputs observation data related to an observation target and outputs estimated observation data, the analysis device comprising:
processing circuitry configured to
input the observation data which is data obtained from mobile phone operation data that provides a distribution of people at a certain time, wherein the observation data is repeatedly input after a predetermined unit of time elapses;

generate first sequence data by applying a first conversion to the observation data;

obtain a current state variable by performing state estimation using a Kalman filter based on a state variable, the state variable being generated for the first sequence data, a state space model, and each element included in the first sequence data based on the state space model, the state space model being obtained by modeling a time-series variation of each element included in the first sequence data;

generate second sequence data by applying an observation process using an observation matrix of the state space model to the current state variable;

generate the estimated observation data by performing an elaboration process of correcting each element included in the second sequence data under a predetermined condition so that a value of each cell of the estimated observation data does not become a negative value and the number of cells having a value other than 0 included in the estimated observation data is suppressed;

apply a second conversion that is an inverse conversion of the first conversion; and output the estimated observation data.

2. The analysis device according to claim 1, wherein the first conversion is multiresolution analysis using a Haar function as a mother wavelet.

3. The analysis device according to claim 1, wherein the processing circuitry generates the first sequence data by expressing the observation data in a sparse data format and applying the first conversion to cells having a value other than 0 included in the observation data.

4. The analysis device according to claim 1, wherein the processing circuitry generates the first sequence data by performing an adjustment process of performing correction under a predetermined condition so that scales of magnitudes of values of elements included in data generated by applying the first conversion to the observation data are adjusted to a same level, and generates the second sequence data by performing an inverse adjustment process of performing correction under a predetermined condition so that a scale of a magnitude of a value of each element included in data generated by applying the observation process using the observation matrix to the current state variable is returned to a scale before the adjustment process.

5. The analysis device according to claim 1, further comprising a memory configured to store the state variable, wherein the processing circuitry updates the state variable stored in the state variable storage unit to the current state variable.

6. The analysis device according to claim 2, wherein the processing circuitry generates the first sequence data by expressing the observation data in a sparse data format and applying the first conversion to cells having a value other than 0 included in the observation data.

7. The analysis device according to claim 1, wherein the processing circuitry:

generates third sequence data by performing the elaboration process; and generates the estimated observation data by applying the second conversion to the third sequence data.

8. A method, implemented by processing circuitry of an analysis device that inputs observation data related to an observation target and outputs estimated observation data, the method comprising:

inputting the observation data which is data obtained from mobile phone operation data that provides a distribution of people at a certain time, wherein the observation data is repeatedly input after a predetermined unit of time elapses;

generating first sequence data by applying a first conversion to the observation data;

obtaining a current state variable by performing state estimation using a Kalman filter based on a state variable, the state variable being generated for the first sequence data, a state space model, and each element included in the first sequence data based on the state space model, the state space model being obtained by modeling a time-series variation of each element included in the first sequence data;

generating second sequence data by applying an observation process using an observation matrix of the state space model to the current state variable;

generating the estimated observation data by performing an elaboration process of correcting each element included in the second sequence data under a predetermined condition so that a value of each cell of the estimated observation data does not become a negative value and the number of cells having a value other than 0 included in the estimated observation data is suppressed;

applying a second conversion that is an inverse conversion of the first conversion; and outputting the estimated observation data.

* * * * *